(12) United States Patent
Andueza et al.

(10) Patent No.: US 11,274,748 B2
(45) Date of Patent: Mar. 15, 2022

(54) MECHANICAL SEAL FOR BIDIRECTIONAL SEALING

(71) Applicants: FMC TECHNOLOGIES DO BRASIL LTDA, Rio de Janeiro (BR); NANOBUSINESS INFORMAÇO E INOVAÇÃO LTDA, Rio de Janeiro (BR)

(72) Inventors: Alejandro Andueza, Rio de Janeiro (BR); Sandro Eugenio Da Silva, Rio de Janeiro (BR); Loïc René Le Bourlegat, Itajuba (BR); Thiago Simões Castanheira Francis Chehuan, Rio de Janeiro (BR); Ronaldo Pedro da Silva, Rio de Janeiro (BR); Lorenzo do Canto Visentin, Rio de Janeiro (BR); Ricardo Nascimento Pombo Do Amaral, Niteroi (BR)

(73) Assignees: FMC TECHNOLOGIES DO BRASIL LTDA, Rio de Janeiro (BR); NANOBUSINESS INFORMAÇO E INOVAÇÃO LTDA, Rio de Janeiro (BR)

( * ) Notice: Subject to any disclaimer, the term of this patent is extended or adjusted under 35 U.S.C. 154(b) by 114 days.

(21) Appl. No.: 16/462,816

(22) PCT Filed: Nov. 17, 2017

(86) PCT No.: PCT/BR2017/050348
§ 371 (c)(1),
(2) Date: May 21, 2019

(87) PCT Pub. No.: WO2018/090120
PCT Pub. Date: May 24, 2018

(65) Prior Publication Data
US 2021/0033196 A1    Feb. 4, 2021

(30) Foreign Application Priority Data

Nov. 21, 2016 (BR) .......................... 102016027258-0

(51) Int. Cl.
*F16J 15/56* (2006.01)
*F16J 15/34* (2006.01)

(52) U.S. Cl.
CPC ................................ *F16J 15/3496* (2013.01)

(58) Field of Classification Search
CPC ...... F16J 15/32; F16J 15/3248; F16J 15/3252; F16J 15/3268; F16J 15/3272; F16J 15/3284; F16J 15/3496
See application file for complete search history.

(56) References Cited

U.S. PATENT DOCUMENTS 3,582,094 A * 6/1971 Whittaker ................ F16J 15/56
                                                            277/584
4,032,159 A * 6/1977 Zitting ................... F16J 15/166
                                                            277/584

(Continued)

FOREIGN PATENT DOCUMENTS

| CA | 2249916 A1 | 9/1999 |
| CN | 106812944 A | 6/2017 |
| DE | 102013110484 A1 | 3/2015 |

OTHER PUBLICATIONS

International Search Report issued in International Application No. PCT/BR2017/050348, dated Mar. 21, 2018 (3 pages).

(Continued)

*Primary Examiner* — Gilbert Y Lee
(74) *Attorney, Agent, or Firm* — Osha Bergman Watanabe & Burton LLP

(57) ABSTRACT

A mechanical seal provides bi-directional sealing and comprising a body in hybrid material, being structured in a component of elastomeric material and a component of (Continued)

segmented or non-segmented composite material distributed in a lagged way along said body. The seal is resistant to extrusion failure at high differential pressures, which facilitates its installation in several equipment elements, such as underwater or ground.

11 Claims, 2 Drawing Sheets

(56) References Cited

U.S. PATENT DOCUMENTS

| | | | |
|---|---|---|---|
| 4,212,477 A | | 7/1980 | Ludwig |
| 5,163,692 A | | 11/1992 | Schofield et al. |
| 5,738,358 A | | 4/1998 | Kalsi et al. |
| 5,791,657 A | | 8/1998 | Cain et al. |
| 6,039,319 A | * | 3/2000 | Coonce ............... F16L 23/22 277/314 |
| 6,173,964 B1 | * | 1/2001 | Bell ..................... E21B 33/04 277/584 |
| 6,302,405 B1 | * | 10/2001 | Edwards .............. E21B 33/10 277/336 |
| 9,939,067 B2 | * | 4/2018 | Janian ................. F16J 15/322 |
| 10,041,325 B2 | * | 8/2018 | McGruddy ......... E21B 33/1216 |
| 2005/0167928 A1 | | 8/2005 | Park et al. |
| 2009/0001671 A1 | | 1/2009 | Dietle et al. |
| 2015/0233371 A1 | | 8/2015 | Harvey et al. |

OTHER PUBLICATIONS

Written Opinion issued in International Application No. PCT/BR2017/050348; dated Mar. 21, 2018 (5 pages).

International Preliminary Report on Patentability and Written Opinion issued in corresponding International Application No. PCT/BR2017/050348, dated Apr. 26, 2019 (27 pages).

\* cited by examiner

MECHANICAL SEAL FOR BIDIRECTIONAL SEALING

FIELD OF THE INVENTION

The present invention relates to a mechanical seal for bidirectional sealing, which comprises a combination of elastomer and composite material to resist extrusion failure under large dimensional clearance conditions. The mechanical seal object of the present invention may be used in any mechanical system where it is necessary to separate two regions with differential pressures ranging from low to high pressures. Thus, the mechanical seal of the present invention is especially suitable for use in underwater or ground equipment requiring the presence of elastomeric seals.

BACKGROUND OF THE INVENTION

As is well known in the art, the mechanical seal was developed by George Cook in the early 20th century, originally called "Cook Seal", and was applied in cooling compressors. Since then there have been improvements due to the demand for seals working at different pressure levels and different mechanisms. Due to this fact, several materials are until now studied and applied to obtain increasingly better results for this mechanical element.

In the oil and gas sector, several types of elastomeric seals are used, which may or may not include reinforcements. Such reinforcements may be obtained either by the addition of other materials to the elastomeric compound or by using one or more additional parts to the elastomeric seal, said parts being metallic, ceramic, polymeric or any other material with several geometries, in order to reinforce the seal and withstand higher differential pressures.

In addition to the variety of material types, there are several elastomeric seal geometries in order to reinforce their structure in a way to withstand higher pressure differentials. Examples of these seals are: O-ring, spring seal and lip seal. These seals have a very efficient behavior and are widely used for the sealing of several components, such as mechanical connectors, flanges, stabs, etc.

These seals are dependent on small dimensional tolerances, in the order of tenths of a millimeter diametrically, which are fundamental to ensure correct preloading and resistance to extrusion of the elastomeric material when subjected to a differential pressure. When these thresholds are exceeded, an elastomer extrusion occurs and the consequent unfeasibility of the seal.

Current elastomeric seals are classified into three groups: elastomeric seals with a single material, for example O-rings; bicomponent elastomeric seals, for example elastomeric ring combined with anti-extrusion ring; and elastomeric seals with more than one material in a single component, for example the lip seal, spring seal.

Single-material elastomeric seals have very limited extrusion strength and are suitable for working with small dimensional tolerances, since they do not have any special anti-extrusion mechanism. The hardening of the elastomer as a mitigating action to avoid extrusion failure compromises the ability to deform at low pressures and to promote sealing. Historically, such seals even in restricted dimensional tolerances do not withstand differential pressures greater than 5,000 psi.

Bicomponent seals, on the other hand, have superior sealing strength at larger clearances and higher pressures. However, the use of a second anti-extrusion component in addition to having assembly limitations does not allow for clearance of the order of a few millimeters, since many of them are made of polymeric materials. Other materials, for example metallic, in turn, compromise the assembly and its dynamic applications due to the risk of scratching the sealing areas.

Finally, seals with more than one material fill a space by combining rubber with other materials. However, such seals have high restrictions on assembly in external and internal diameters due to the restriction imposed by using more resistant materials. In the case of metallic materials, these can damage the sealing areas in case of ndynamic applications. In all current systems, the operating mechanism of these sealing rings seeks a balance between the seal material elastic deformation, which is important for sealing, the small dimensional component clearances which is important for extrusion strength, and elastic deformation required for assembling in several diameters.

US2015233371, US2005167928 and U.S. Pat. No. 5,791,657 disclose mechanical seals of the closest prior art to the present invention as they disclose seals which have sealing and anti-extrusion elements. However, the combination of high dimensional clearance, assembly and high differential pressure cannot be supported by existing elastomeric seals, whether with or without reinforcements.

The above mentioned mechanical seals have as main limitations the combination of certain factors, such as, for example, the dimensional clearances necessary to avoid extrusion failure of the elastomeric material, typically limited to a maximum of tenths of a millimeter, and the ability to deform for assembly in machined housings at external and internal diameters, restricting the options of reinforcements, which, because they are required to accept high elastic deformation, do not present high mechanical strength to withstand pressure differentials in the order of tens of thousands of psi, for example 20,000 psi.

The present invention therefore provides for the correction of the above problems for the mechanical seals of the prior art, which will evidently result in a significant increase in efficiency in relation to the sealing and anti-extrusion due to the pressure differential, effects of which have long been searched by those skilled in the art.

BRIEF DESCRIPTION OF THE INVENTION

It is therefore the object of the present invention to provide a bicomponent mechanical seal which supports larger differential pressures and diametrical clearances with no failure of elastomer extrusion seal, and which also ensures a low-pressure seal.

The bicomponent mechanical seal object of the present invention comprises an elastomeric ring with a reinforcement of segmented and lagged composite material. Unlike prior art seals, such segmented bicomponent seal reinforcements of the invention facilitate assembly in machined housings.

BRIEF DESCRIPTION OF THE DRAWINGS

The mechanical seal according to the present invention may be better understood in its structure, function and effects from the accompanying schematic figures which, by way of non-limiting scope, represent.

DETAILED DESCRIPTION OF THE INVENTION

The mechanical seal for bidirectional sealing of the present invention has been designed for use in static and/or dynamic applications in submarine and ground equipment to effect diametrical seals with process fluid, oil or gas or a combination of both. Thus, the mechanical seal for bidirectional sealing of the present invention may be used for low pressure seals, for example, less than 300 psi, or for high pressure seals, which may reach, for example, 30,000 psi or more.

Figure 1:
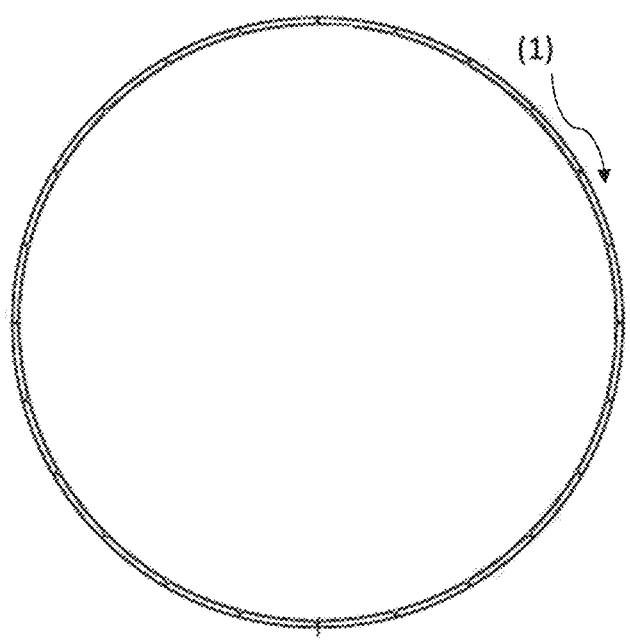
FIG. 1—a top view of a mechanical seal for bidirectional sealing according to the present invention.
Figure 2:
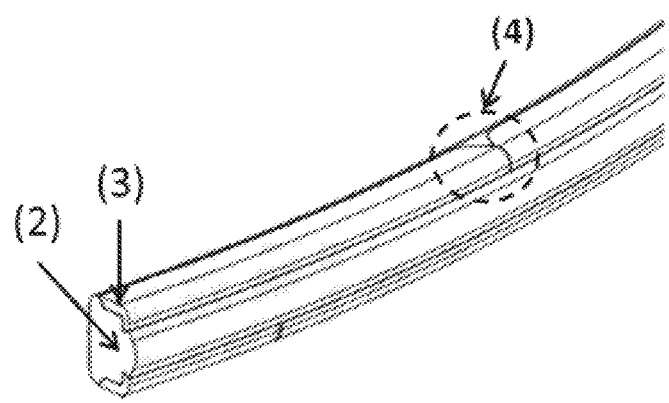
FIG. 2—a partial cross-section perspective view of the mechanical seal for bidirectional sealing according to the present invention.
Figure 3:
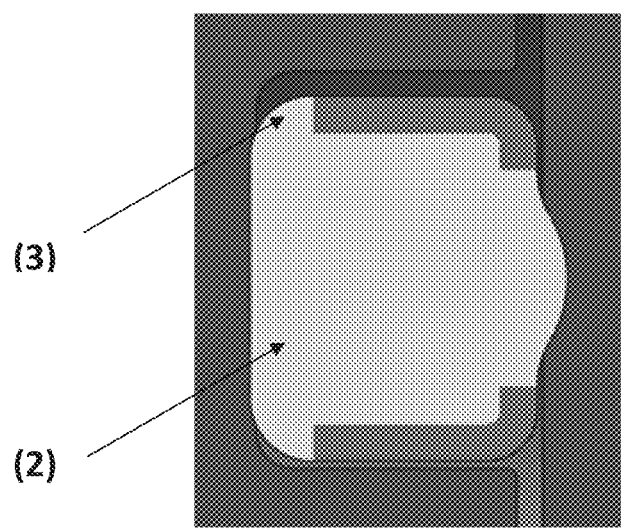
FIG. 3—a cross-sectional view of the mechanical seal for bidirectional sealing according to the present invention.

The bidirectional seal according to the present invention, as seen in FIGS. 1, 2, and 3, has a body (1) in a hybrid material (elastomer+composite), being structured in an elastomeric material component (2) and a segmented or non-segmented composite material component (3).

An example of an arrangement in which the seal is composed is shown in FIG. 2, where the elastomeric material component (2) preferably has properties of an amorphous material, i.e., it does not have an ordered polymer chain, and has a high elasticity. Therefore, the elastomeric component (2) may deform when subjected to high differential pressure and return to its original shape after the said pressure has stopped.

The elastomeric component (2) of the mechanical seal for bidirectional sealing according to the present invention may be made of any material, such as NBR, HNBR, FKM, FFKM or any other material with suitable elastomeric property. Obviously, the elastomer type is defined by the differential pressure regime in which the seal of the present invention will work and the environment type (fluids and gases) it is expected to withstand.

The profile of the elastomeric component (2) is not limited to that shown in FIG. 2, so that it may range depending on the housing shape in the part where it will be installed as well as the pressure class of the seal.

The mechanical seal for bidirectional sealing of the present invention is a hybrid material having at least two components in its physical structure and clearly distinct, an elastomeric component (2) and a segmented or non-segmented reinforcement (3) being continuous fibers dispersed in a polymer matrix, such as for example glass, carbon or aramid fiber, among others. However, it should be noted that such substituted continuous fibers may be produced in other materials, such as metals or metal alloys, among others, depending on the specific application.

The sealing efficiency for high clearances is due to the elastomer assembly and composite reinforcement, since the reinforcement is intended to prevent the extrusion of the elastomer caused by the clearance and the differential pressure. The segmentation of this reinforcement has the function of facilitating the seal assembly, expanding its application in function of the dimensional variables and rigidity of the elastomer. Therefore, segmented reinforcement is important in preventing elastomer extrusion seal failure.

Another aspect to be observed is the fact that the profile of the segmented reinforcement (3) will depend on the profile of the elastomeric component (2), which may range according to the application of the mechanical seal for bidirectional sealing of the present invention, as can be seen in FIG. 3.

The geometry of the mechanical seal for bidirectional sealing of the present invention allows to facilitate assembly in machined housings in diameters due to the use of the combined segmented inserts/reinforcements. The segmentation of the reinforcements in composite material is performed in a lagged manner, as highlighted in detail (4), as a fundamental characteristic to minimize the extrusion failure, since it prevents the existence of a continuous section of only elastomeric material.

The lagging of the reinforcements is important because, for configurations with segmented inserts, the transition between two inserts necessarily exposes an area composed only of rubber, which implies in the concentration of pressure in this area and due to its lower mechanical resistance, implies in a higher possibility of extrusion failure. The lagging of the segments prevents the existence of a continuous section of elastomeric material and therefore always adds a mechanical resistance barrier (insert) in the fragile regions.

The present invention has the apparent advantages of rendering the mechanical seal for bidirectional sealing resistant to extrusion failure for components having high radial clearance, of the order of 3.0 mm or more, combined with high differential pressures, typically ranging from 5,000 to 20,000 psi or more.

The invention claimed is:

1. A mechanical seal for bidirectional sealing, comprising a body in hybrid material being structured in a component of elastomeric material, and a component of segmented reinforcement composite material, distributed in a lagged way along an outer surface of said body such that transitions between adjacent segments of the segmented reinforcement composite material are axially and circumferentially offset from transitions between other adjacent segments of the segmented reinforcement composite material, wherein the lag prevents the formation of an exposed continuous section of elastomer.

2. The mechanical seal for bidirectional sealing according to claim 1, wherein the elastomeric component is a high elastic amorphous material or any other elastomeric material.

3. The mechanical seal for bidirectional sealing according to claim 2, wherein the elastomeric component is made of NBR, HNBR, FKM, FFKM or any other material.

4. The mechanical seal for bidirectional sealing according to claim 1, wherein the elastomeric component is shaped according to the housing in a part where it will be installed.

5. The mechanical seal for bidirectional sealing according to claim 1, wherein the segmented reinforcement is produced by the dispersion of continuous fibers in a polymeric matrix.

6. The mechanical seal for bidirectional sealing according to claim 5, wherein the segmented reinforcement is produced in glass fiber, carbon fiber, aramid fiber or any other material.

7. The mechanical seal for bidirectional sealing according to claim 1, wherein the segmented reinforcement is produced in metal or metal alloys.

8. The mechanical seal for bidirectional sealing according to claim 1, wherein the mechanical seal is resistant to extrusion failure for components with radial clearance of the order of at least 3.0 mm combined with high differential pressures typically ranging from at least 5,000 psi to 20,000 psi.

9. The mechanical seal for bidirectional sealing according to claim 1, wherein the component of segmented reinforcement composite material is permanently coupled to the component of elastomeric material.

10. The mechanical seal for bidirectional sealing according to claim 1, wherein a profile of the component of segmented reinforcement composite material has a curvature that matches a curvature of a profile of the component of elastomeric material.

11. The mechanical seal for bidirectional sealing according to claim 10, wherein the curvature of the profile of the component of segmented reinforcement composite material is such that the segmented reinforcement composite material curves from a side surface of the component of elastomeric material to a circumferential surface of the component of elastomeric material.

* * * * *

UNITED STATES PATENT AND TRADEMARK OFFICE
CERTIFICATE OF CORRECTION

PATENT NO. : 11,274,748 B2
APPLICATION NO. : 16/462816
DATED : March 15, 2022
INVENTOR(S) : Alejandro Andueza et al.

It is certified that error appears in the above-identified patent and that said Letters Patent is hereby corrected as shown below:

On the Title Page

Item (71) Applicants, the word "INFORMAÇO" should read -- INFORMAÇÃO --.

Item (73) Assignees, the word "INFORMAÇO" should read -- INFORMAÇÃO --.

Signed and Sealed this
Thirty-first Day of May, 2022

Katherine Kelly Vidal
*Director of the United States Patent and Trademark Office*